United States Patent
Iwai et al.

(10) Patent No.: US 10,979,984 B2
(45) Date of Patent: Apr. 13, 2021

(54) TERMINAL AND COMMUNICATION METHOD

(71) Applicant: Panasonic Intellectual Property Corporation of America, Torrance, CA (US)

(72) Inventors: Takashi Iwai, Ishikawa (JP); Lilei Wang, Beijing (CN); Hidetoshi Suzuki, Kanagawa (JP); Tomofumi Takata, Ishikawa (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/634,070

(22) PCT Filed: Aug. 10, 2017

(86) PCT No.: PCT/CN2017/096723
§ 371 (c)(1),
(2) Date: Jan. 24, 2020

(87) PCT Pub. No.: WO2019/028716
PCT Pub. Date: Feb. 14, 2019

(65) Prior Publication Data
US 2020/0245264 A1  Jul. 30, 2020

(51) Int. Cl.
*H04W 52/36* (2009.01)
*H04W 52/32* (2009.01)
*H04W 24/10* (2009.01)

(52) U.S. Cl.
CPC ........ *H04W 52/365* (2013.01); *H04W 24/10* (2013.01); *H04W 52/325* (2013.01)

(58) Field of Classification Search
CPC .... H04W 52/36; H04W 52/365; H04W 52/42
USPC .................................. 455/69, 522; 370/329
See application file for complete search history.

(56) References Cited

U.S. PATENT DOCUMENTS

| | | | |
|---|---|---|---|
| 2015/0189600 A1* | 7/2015 | Choi | H04W 52/365 455/522 |
| 2016/0119883 A1* | 4/2016 | Lee | H04W 52/365 370/329 |
| 2016/0262118 A1* | 9/2016 | Kim | H04W 52/365 |
| 2017/0019864 A1* | 1/2017 | Hwang | H04W 52/365 |
| 2018/0115957 A1* | 4/2018 | Lin | H04W 52/146 |
| 2018/0132197 A1* | 5/2018 | Lin | H04W 52/42 |
| 2018/0310257 A1* | 10/2018 | Papasakellariou | H04W 52/30 |

(Continued)

OTHER PUBLICATIONS

3GPP TS 36.213 V14.3.0, "3rd Generation Partnership Project; Technical Specification Group Radio Access Network; Evolved Universal Terrestrial Radio Access (E-UTRA); Physical layer procedures (Release 14)," Jun. 2017, 460 pages.

(Continued)

*Primary Examiner* — Tan H Trinh
(74) *Attorney, Agent, or Firm* — Seed IP Law Group LLP

(57) ABSTRACT

In a terminal (100), a PH calculator (105) calculates one or more power headrooms, each of which being calculated for each beam, and a radio transmitter (108) transmits the one or more power headrooms for a number of beams, the number being determined in accordance with a type of power headroom, or a trigger condition serving as a trigger for power headroom reporting.

12 Claims, 6 Drawing Sheets

| Reported Information | When PHs for all respective beams are indicated | Variation of Embodiment 1 |
|---|---|---|
| Type 1 PH | $PH_{type1\_beam\#0}$<br>$PH_{type1\_beam\#1}$<br>$PH_{type1\_beam\#2}$<br>→6 × 3 bits | $PH_{type1\_beam\#0}$<br>$PH_{type1\_beam\#1}$<br>$PH_{type1\_beam\#2}$<br>→6 × 3 bits |
| Type 2 PH | $PH_{type2\_beam\#0}$<br>$PH_{type2\_beam\#1}$<br>$PH_{type2\_beam\#2}$<br>→6 × 3 bits | $PH_{type2\_beam\#0}$<br>→6 bits |
| Others | | Actual $P_{cmax\_type1}$<br>Actual $P_{cmax\_type2}$<br>→6 × 2 bits |
| Signaling overhead | 36 bits | 36 bits |

(56) References Cited

U.S. PATENT DOCUMENTS

| | | | |
|---|---|---|---|
| 2018/0368081 A1* | 12/2018 | Akkarakaran | H04W 52/42 |
| 2019/0182682 A1* | 6/2019 | Kim | H04W 72/0413 |
| 2019/0223117 A1* | 7/2019 | Chai | H04W 52/367 |
| 2019/0387483 A1* | 12/2019 | Lee | H04W 52/42 |
| 2020/0022094 A1* | 1/2020 | You | H04W 76/27 |
| 2020/0068509 A1* | 2/2020 | Ahn | H04W 52/281 |
| 2020/0084735 A1* | 3/2020 | Cheng | H04W 52/36 |
| 2020/0145079 A1* | 5/2020 | Marinier | H04W 74/0833 |
| 2020/0145936 A1* | 5/2020 | Lee | H04W 52/365 |

OTHER PUBLICATIONS

3GPP TS 36.321 V14.3.0, "3rd Generation Partnership Project; Technical Specification Group Radio Access Network; Evolved Universal Terrestrial Radio Access (E-UTRA); Medium Access Control (MAC) protocol specification (Release 14)," Jun. 2017, 107 pages.

International Search Report, dated Apr. 27, 2018, for corresponding International Application No. PCT/CN2017/096723, 2 pages.

"RAN1 Chairman's Notes," 3GPP TSG RAN WG1 Meeting #89, Hangzhou, P.R. China, May 15-19, 2017, 143 pages.

"RAN1 Chairman's Notes," 3GPP TSG RAN WG1 NR Ad-Hoc#2, Qingdao, P.R. China, Jun. 27-30, 2017, 77 pages.

\* cited by examiner

| Reported Information | When PHs for all respective beams are indicated | Embodiment 1 |
|---|---|---|
| Type 1 PH | $PH_{type1\_beam\#0}$<br>$PH_{type1\_beam\#1}$<br>$PH_{type1\_beam\#2}$<br>$\rightarrow 6 \times 3$ bits | $PH_{type1\_beam\#0}$<br>$PH_{type1\_beam\#1}$<br>$PH_{type1\_beam\#2}$<br>$\rightarrow 6 \times 3$ bits |
| Type 2 PH | $PH_{type2\_beam\#0}$<br>$PH_{type2\_beam\#1}$<br>$PH_{type2\_beam\#2}$<br>$\rightarrow 6 \times 3$ bits | $PH_{type2\_beam\#0}$<br>$\rightarrow 6$ bits |
| Signaling overhead | 36 bits | 24 bits |

FIG. 5

| Reported Information | When PHs for all respective beams are indicated | Variation of Embodiment 1 |
|---|---|---|
| Type 1 PH | $PH_{type1\_beam\#0}$<br>$PH_{type1\_beam\#1}$<br>$PH_{type1\_beam\#2}$<br>$\rightarrow 6 \times 3$ bits | $PH_{type1\_beam\#0}$<br>$PH_{type1\_beam\#1}$<br>$PH_{type1\_beam\#2}$<br>$\rightarrow 6 \times 3$ bits |
| Type 2 PH | $PH_{type2\_beam\#0}$<br>$PH_{type2\_beam\#1}$<br>$PH_{type2\_beam\#2}$<br>$\rightarrow 6 \times 3$ bits | $PH_{type2\_beam\#0}$<br>$\rightarrow 6$ bits |
| Others | | Actual $P_{cmax\_type1}$<br>Actual $P_{cmax\_type2}$<br>$\rightarrow 6 \times 2$ bits |
| Signaling overhead | 36 bits | 36 bits |

FIG. 6

| Reported Information | When PHs for all respective beams are indicated | Embodiment 3 |
|---|---|---|
| Type 1 PH | $PH_{type1\_beam\#0}$<br>$PH_{type1\_beam\#1}$<br>$PH_{type1\_beam\#2}$<br>→6 × 3 bits | $PH_{type1\_beam\#0}$<br>→6 bits<br>$PH_{type1\_beam\#1\_offset}$<br>$PH_{type1\_beam\#2\_offset}$<br>→5 × 2 bits |
| Type 2 PH | $PH_{type2\_beam\#0}$<br>$PH_{type2\_beam\#1}$<br>$PH_{type2\_beam\#2}$<br>→6 × 3 bits | $PH_{type2\_beam\#0}$<br>→6 bits<br>$PH_{type2\_beam\#1\_offset}$<br>$PH_{type2\_beam\#2\_offset}$<br>→5 × 2 bits |
| Signaling overhead | 36 bits | 32 bits |

FIG. 7

| Reported Information | When PHs for all respective beams are indicated | Embodiment 1 + Embodiment 3 |
|---|---|---|
| Type 1 PH | $PH_{type1\_beam\#0}$<br>$PH_{type1\_beam\#1}$<br>$PH_{type1\_beam\#2}$<br>→6 × 3 bits | $PH_{type1\_beam\#0}$<br>→6 bits<br>$PH_{type1\_beam\#1\_offset}$<br>$PH_{type1\_beam\#2\_offset}$<br>→5 × 2 bits |
| Type 2 PH | $PH_{type2\_beam\#0}$<br>$PH_{type2\_beam\#1}$<br>$PH_{type2\_beam\#2}$<br>→6 × 3 bits | $PH_{type2\_beam\#0}$<br>→6 bits |
| Signaling overhead | 36 bits | 22 bits |

FIG. 8

TERMINAL AND COMMUNICATION METHOD

TECHNICAL FIELD

The present disclosure relates to a terminal and a communication method.

BACKGROUND ART

In the standardization of the fifth generation mobile communication system (5G), a new radio access technology (New Radio: NR) which is not necessarily backward compatible to LTE/LTE Advanced has been discussed.

In discussion of a transmission power control method for terminals (each may be referred to as "User Equipment (UE)") for NR, a feature enhancement taking into account beam transmission and reception for NR (directivity transmission and reception) using the LTE transmission power control method as the basis of the method has been under study.

In addition, in NR, performing Power Headroom Reporting (PHR) as in LTE has been discussed, in which terminals each report a power headroom indicating how much transmission power is left for the terminal to a base station (may be referred to as "eNB" or "gNB").

CITATION LIST

Non-Patent Literature

NPL 1
 3GPP TS 36.213 V14.3.0, "Physical layer procedures (Release 14)" (2017-06)
NPL 2
 3GPP TS 36.321 V14.3.0, "Medium Access Control (MAC) protocol specification (Release 14)" (2017-06)
NPL 3
 3GPP RAN1 #89 chairman's note
NPL 4
 3GPP RAN1 NR Adhoc #2 chairman's note

SUMMARY OF INVENTION

There have been, however, no sufficient studies on a PHR method of a case where beam transmission and reception is taken into account in NR.

One non-limiting and exemplary embodiment facilitates providing a terminal and a communication method each capable of appropriately performing PHR.

A terminal according to an aspect of the present disclosure includes: circuitry, which, in operation, calculates one or more power headrooms, each of which being calculated for each beam; and a transmitter, which in operation, transmits the one or more power headrooms for a number of beams, the number being determined in accordance with a type of power headroom, or a trigger condition serving as a trigger for power headroom reporting.

A communication method according to an aspect of the present disclosure includes: calculating one or more power headrooms, each of which being calculated for each beam; and transmitting the one or more power headrooms for a number of beams, the number being determined in accordance with a type of power headroom, or a trigger condition serving as a trigger for power headroom reporting.

Note that the comprehensive or specific aspects mentioned above may be implemented by a system, an apparatus, a method, an integrated circuit, a computer program or a recoding medium, or any combination of the system, the apparatus, the method, the integrated circuit, the computer program, and the recoding medium.

According to an aspect of this disclosure, PHR can be appropriately performed.

The specification and the drawings make it clear more advantages and effects in an aspect of this disclosure. Such advantages and/or effects are provided by the features disclosed in some embodiments as well as the specification and the drawings, but all of them do not have to be provided in order to obtain one or more identical features.

BRIEF DESCRIPTION OF DRAWINGS

FIG. 5 is a diagram illustrating an example of a signaling amount according to Embodiment 1;

FIG. 6 is a diagram illustrating an example of a signaling amount according to a variation of Embodiment 1;

FIG. 7 is a diagram illustrating an example of a signaling amount according to Embodiment 3; and FIG. 8 is a diagram illustrating another example of the signaling amount according to Embodiment 3.

DESCRIPTION OF EMBODIMENTS

Figure 1:
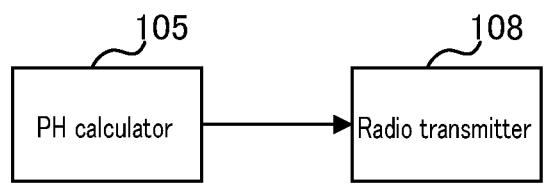
FIG. 1 is a block diagram illustrating part of a configuration of a terminal.

Hereinafter, a detailed description will be given of embodiments of the present disclosure with reference to the accompanying drawings.

In LTE, a terminal reports a PH to a base station for each carrier component (CC). The PH is used by the base station to perform transmission channel scheduling (adaptive modulation and/or channel coding and/or closed-loop transmission power control, for example) for the terminal. Equation 1 expresses a definitional equation of PH (Type 1 PH ($PH_{type1}$)) for transmission power of Physical Downlink Shared Channel (PUSCH) used in LTE (see, e.g., NPL 1). Moreover, Equation 2 expresses the transmission power of PUSCH.

$$PH_{type1} = P_{cmax\_type1} - P_{pusch} \qquad \text{(Equation 1)}$$

$$P_{pusch} = 10\log 10(M_{pusch}) + P_{o\_pusch}\alpha \cdot PL + \Delta + f \qquad \text{(Equation 2)}$$

In Equations 1 and 2, "$P_{cmax\_type}$" represents the maximum transmission power [dBm] of a terminal during PUSCH transmission, "$M_{pusch}$" represents the transmission bandwidth [PRB] of PUSCH, "$P_{o\_pusch}$" represents a parameter value [dBm] previously configured by a base station, "PL" represents a path loss [dB] measured by a terminal, "a" represents a weight coefficient (previously configured value) indicating a compensation factor of the path loss, "Δ" represents an offset [dB] dependent on a modulation and coding scheme (MCS) of data to be transmitted, and "f" represents an additional value including a passed transmission power control value (e.g., relative value such as +3 dB or −1 dB).

"$P_{o\_pusch}$," "α," and "Δ" herein are parameters to be indicated from a base station to a terminal and are values that the base station can know.

Meanwhile, "PL" and "f" are values that the base station cannot accurately know. More specifically, "PL" is a value to be measured in a terminal. Moreover, although "f" is a parameter to be indicated to a terminal from a base station, there is a case where the terminal cannot receive the indication (e.g., case where Physical Downlink Control Channel (PDCCH) cannot be detected). The base station cannot determine whether or not the terminal has successfully received the indication, so that, when the terminal fails to receive a transmission power control value from the base station even once, understanding of the transmission power control value (additional value) no longer matches between the terminal and base station. For this reason, a base station needs a PH from a terminal (i.e., terminal needs to perform PHR) in order to match the understanding of the base station with the understanding of the terminal regarding uplink (UL) transmission power to appropriately perform scheduling.

In PHR of LTE, a terminal performs PHR every time a predetermined condition prescribed by a base station is satisfied (e.g., a case where predetermined period has passed since the last PHR and a case where "PL" has changed by an amount equal to or greater than a threshold). Moreover, a PH is transmitted via PUSCH as medium access control (MAC) information of transition data (e.g., 6 bits information) (see, e.g., NPL 2).

In LTE-Advanced, a terminal transmits, to a base station, PHs of all CCs configured in the terminal, using PUSCH of a certain CC, when performing PHR. In a CC in which no PUSCH is scheduled by the base station (CC in which transmission format information; UL transmission bandwidth and MCS information are not configured), the terminal cannot calculate the transmission power of PUSCH and a PH according to Equations 1 and 2. In this respect, for the purpose of calculating a PH for a CC in which no PUSCH is scheduled, a calculation formula is defined, in which predetermined fixed values are set for the parameters included in Equation 2 (so called, reference format or virtual format).

In LTE-Advanced, two types of PHRs called "Type 1 PHR" and "Type 2 PHR" are supported. Type 1 PHR makes reporting of a PUSCH-based PH (Type 1 PH ($PH_{type1}$)) calculated according to Equation 1. Meanwhile, Type 2 PHR makes reporting of a PH calculated according to Equation 3 (Type 2 PH ($PH_{type2}$)). Type 2 PHR is PHR at the time of frequency division multiplexing (FDM) of PUSCH and Physical Uplink Control Channel (PUCCH). In LTE-Advanced, in a CC to which FDM of PUSCH and PUCCH is applied, a terminal reports a PUSCH-based Type 1 PH ($PH_{type1}$) and PUSCH+PUCCH-based Type 2 PH ($PH_{type2}$), using the abovementioned two types of PHR.

Note that, in a CC having no PUCCH or PUSCH scheduling, a terminal applies the reference format mentioned above to calculate a PH.

$$PH_{type2} = P_{cmax\_type2} - \{P_{pusch} + P_{pucch}\} \quad \text{(Equation 3)}$$

$$P_{pucch} = P_{o\_pucch} + PL + h + \Delta_{pucch} + g \quad \text{(Equation 4)}$$

In Equation 3, "$P_{cmax\_type2}$" represents the maximum transmission power [dBm] of a terminal at the time of FDM of PUSCH and PUCCH, and "$P_{pucch}$" represents the transmission power of PUCCH and is expressed by Equation 4. In addition, in Equation 4, "$P_{o\_pucch}$" represents a parameter value [dBm] to be previously configured by a base station, "$\Delta_{pucch}$" and "h" represent control information or an offset [dB] dependent on a frame format, and "g" represents an additional value including a past transmission power control value.

Note that, "f" in Equation 2 and "g" in Equation 4 are values to be controlled independently from each other.

In NR, it is at least agreed that UL transmission power is calculated using a PL for each beam (beam specific PL) (see, e.g., NPL 3). In other words, in NR, it is agreed that the transmission power of PUSCH and the transmission power of PUCCH are calculated using a path loss for each beam (path loss of beam number x: $PL_{beam\ \#x}$) as expressed in Equations 5 and 6.

$$P_{pusch} = 10 \log 10(M_{pusch}) + P_{o\_pusch} + \alpha \cdot PL_{beam\ \#x} + \Delta + f \quad \text{(Equation 5)}$$

$$P_{pucch} = P_{o\_pucch} + PL_{beam\ \#x} + h + \Delta_{pucch} + g \quad \text{(Equation 6)}$$

The term "each beam" used herein means each transmission directivity pattern of a terminal, or each combination of a transmission directivity pattern of a terminal and a reception directivity pattern of a base station (also referred to as "Beam Pair Links (BPL)").

Note that, for Equations 5 and 6, a case where a path loss is measured for each beam ($PL_{beam\ \#x}$) is described as an example, there is a possibility that a parameter other than a path loss ($PL_{beam\ \#x}$) is controlled for each beam.

As expressed in Equations 5 and 6, it is agreed in NR that transmission power control values ("f" in Equation 5 and "g" in Equation 6) are independently controlled between PUSCH and PUCCH as in LTE (e.g., see, NPL 4).

As described above, in NR, for the purpose of calculating UL transmission power using a PL for each beam (beam specific PL), a terminal needs to report a PH for each beam. Moreover, in NR, PHR needs to be performed for each PH type corresponding to PUSCH and PUCCH. For this reason, in NR, when transmission power control is independently performed for each beam and each channel, each corresponding PHR type needs to be added. For this reason, there arises a problem in NR in that the overhead for PHR increases.

In this respect, in an aspect of the present disclosure, a description will be given of a method of reporting a PH with a reduced overhead for PHR by taking into account beam transmission and reception and a channel and/or the like to be transmitted.

Embodiment 1

[Summary of Communication System]

A communication system according to an embodiment of the present disclosure includes base station 100 and terminal 200.

FIG. 1 is a block diagram illustrating part of a configuration of terminal 100 according to the embodiment of the present disclosure. In terminal 100 illustrated in FIG. 1, PH calculator 105 calculates a power headroom (PH) for each beam, and radio transmitter 108 transmits a power headroom or power headrooms for the number of beams to be determined in accordance with a power headroom type (PH type) or a trigger condition serving as a trigger for power headroom reporting (PHR).

[Configuration of Terminal]

Figure 2:
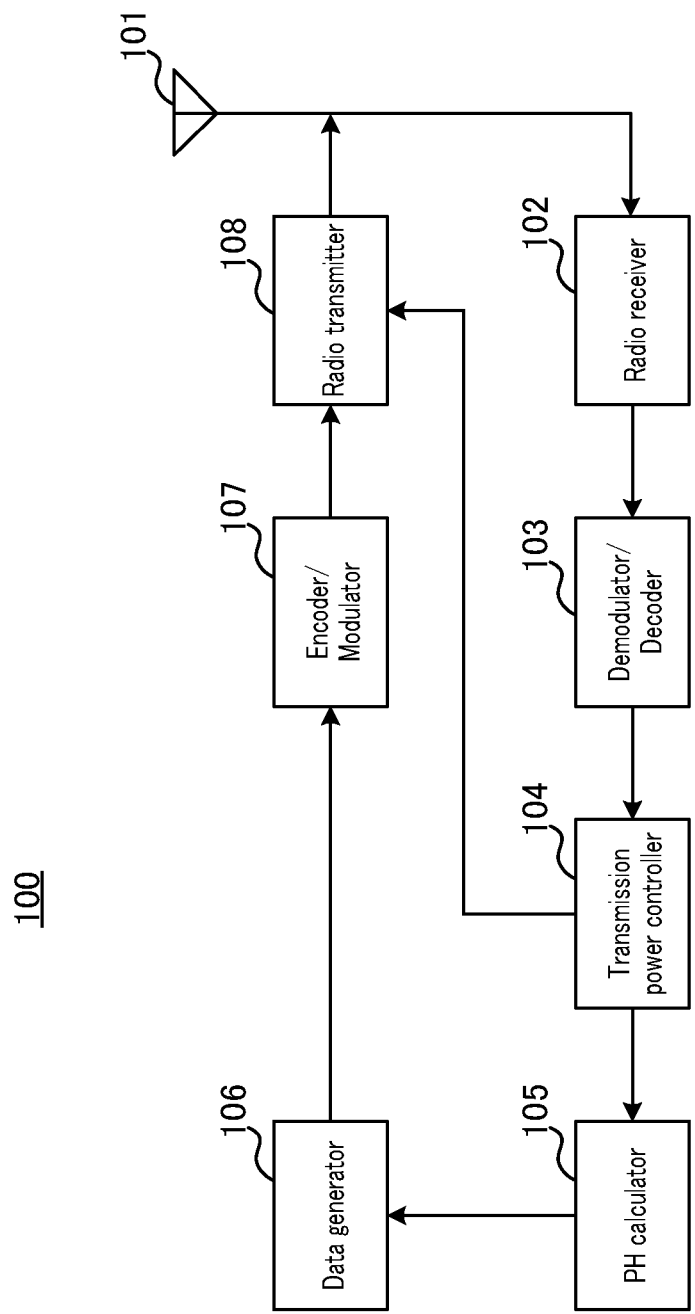
FIG. 2 is a block diagram illustrating the configuration of the terminal.

FIG. 2 is a block diagram illustrating the configuration of terminal 100 according to Embodiment 1. Terminal 100 transmits a PH to base station 200.

In FIG. 2, terminal 100 includes antenna 101, radio receiver 102, demodulator and/or decoder 103, transmission power controller 104, PH calculator 105, data generator 106, encoder and/or modulator 107, and radio transmitter 108.

Radio receiver 102 applies reception processing, such as down conversion and/or analog to digital conversion to a received signal received via antenna 101, and outputs the received signal to demodulator/decoder 103.

Demodulator/decoder 103 applies demodulation and decoding to the received signal to be inputted from radio receiver 102, and extracts, from the result of decoding, UL channel resource information and transmission power information directed to terminal 100 and transmitted from base station 200. Demodulator/decoder 103 outputs the extracted information to transmission power controller 104.

The UL channel resource information contains, for example, frequency resource information (e.g., such as transmission bandwidth and/or transmission band position (such as PRB number or block number)), and time resource information (e.g., such as slot number and/or orthogonal frequency division multiplexing (OFDM) symbol number for transmitting a UL channel), for terminal 100 to transmit a UL channel (PUSCH and PUCCH).

Moreover, the transmission power information contains, for example, a parameter used for calculating UL channel transmission power, a beam number, transmission power control information (e.g., such as parameter information for Equation 2 relating to PUSCH and Equation 4 relating to PUCCH) and/or the like.

Note that, all UL channel resource information or transmission power information need not be indicated to terminal 100, simultaneously. For example, some of the transmission power information may be indicated as cell common information or as semi-static indication information to terminal 100. Moreover, some of the transmission power information, for example, may be prescribed by specification as system common information, and may not be indicated to terminal 100 from base station 200.

Transmission power controller 104 calculates UL channel (PUSCH or PUCCH) transmission power based on the UL channel resource information and transmission power information to be inputted from demodulator/decoder 103. More specifically, transmission power controller 104 measures a PL for a beam with the beam number indicated from base station 200. Transmission power controller 104 then calculates UL channel transmission power according to Equation 5 for PUSCH and according to Equation 6 for PUCCH. Moreover, transmission power controller 104 outputs the result of calculation (information indicating transmission power) to PH calculator 105 and radio transmitter 109.

PH calculator 105 calculates two types of PHs, which are Type 1 PH ($PH_{type1}$) and Type 2 PH ($PH_{type2}$), according to Equations 1 and 3 when a predetermined trigger condition is satisfied (e.g., case where the change amount of PL is equal to or greater than a threshold or case where at least a predetermined period has passed), and outputs the PH information indicating the calculated PHs to data generator 106. At this time, PH calculator 105 calculates a PH for each beam in each PH type.

Note that, PH calculator 105 calculates Type 2 PH ($PH_{type2}$) expressed by Equation 3' instead of Type 2 PH expressed by Equation 3.

$$PH_{type2} = P_{cmax} - P_{pucch} \quad \text{(Equation 3')}$$

Furthermore, PH calculator 105 calculates a PH using a previously defined reference format for a case of a CC having no frequency and/or transmission information of PUSCH or PUCCH (i.e., in case of a CC in which no UL channel is scheduled). The reference format of transmission power $P_{pusch}$ of PUSCH is expressed by Equation 7, and the reference format of transmission power $P_{pucch}$ of PUCCH is expressed by Equation 8, for example.

$$P_{pusch} = P_{o\_pusch} + \alpha \cdot PL_{beam\ \#x} + f \quad \text{(Equation 7)}$$

$$P_{pucch} = P_{o\_pucch} - PL_{beam\ \#x} + g \quad \text{(Equation 8)}$$

PH calculator 105 may calculate, in addition to Type 1 PH and Type 2 PH, a new type of PH (e.g., such as Type N1 PH or Type N2 PH) for which a transmission power control value is independently controlled.

Furthermore, PH calculator 105 determines the number of PHs for respective beams to be reported to base station 200 (i.e., the number of beams for which PHs are to be reported) in accordance with a PH type, for example, and outputs the PH information indicating the determined number of PHs to data generator 106.

Note that, the PH calculation method in PH calculator 105 will be described in detail, hereinafter.

Data generator 106 generates data to be transmitted by terminal 100. Data generator 106 generates transmission data by including the PH information (e.g., MAC information) to be inputted from PH calculator 105 and outputs the generated transmission data to encoder/modulator 107.

Encoder/modulator 107 encodes and modulates the transmission data to be inputted from data generator 106 and outputs the modulated data signal to radio transmitter 108.

Radio transmitter 108 applies digital to analog conversion and/or up-conversion to the signal to be inputted from encoder/modulator 107 and transmits the radio signal thus obtained to base station 200 via antenna 101 using the transmission power information to be inputted from transmission power controller 104. In other words, a PH or PHs in a number to be determined in accordance with a PH type is/are transmitted via radio transmitter 108.

[Configuration of Base Station]

Figure 3:
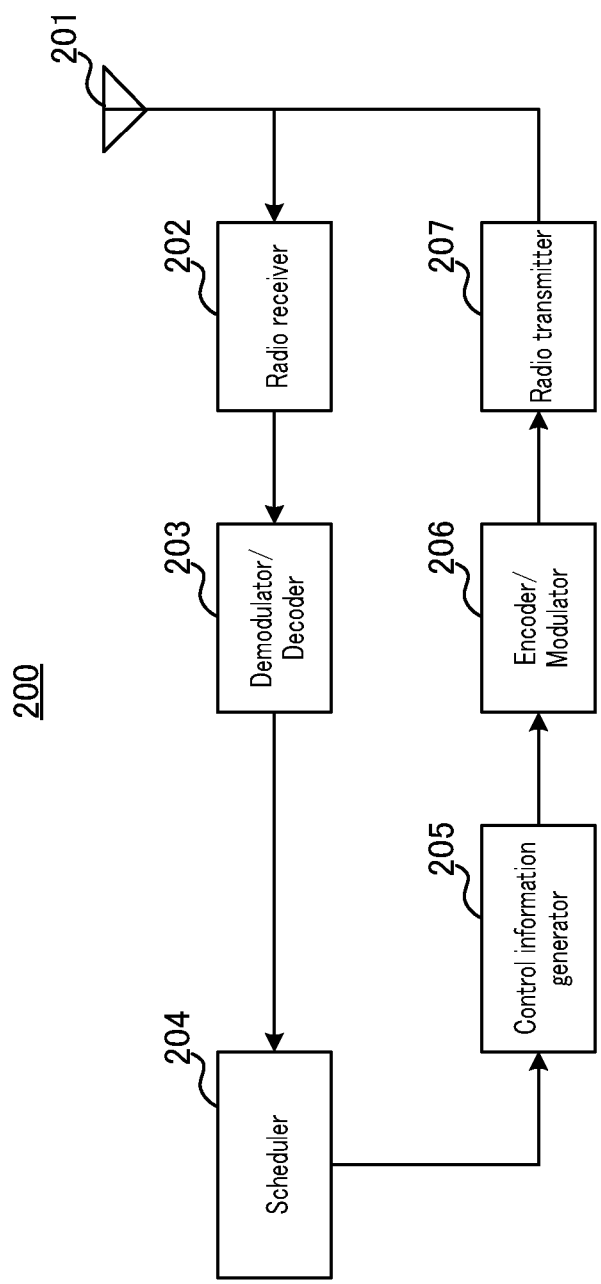
FIG. 3 is a block diagram illustrating a configuration of a base station.

FIG. 3 is a block diagram illustrating a configuration of base station 200 according to Embodiment 1. Base station 200 receives a PH to be transmitted from terminal 100.

In FIG. 3, base station 200 includes antenna 201, radio receiver 202, demodulator and/or decoder 203, scheduler 204, control information generator 205, encoder and/or modulator 206, and radio transmitter 207.

Radio receiver 202 applies reception processing, such as down conversion and/or analog to digital conversion to a signal received from terminal 100 via antenna 201, and outputs the received signal to demodulator/decoder 203.

Demodulator/decoder 203 applies demodulation and decoding to the received signal to be inputted from radio receiver 202 and outputs the decoded signal to scheduler 204.

Scheduler 204 performs scheduling (such as radio resource allocation or transmission power control) of a transmission channel of terminal 100 based on the signal to be inputted from demodulator/decoder 203 (including a PH reported from terminal 100). In this scheduling, scheduler 204 estimates unreported PH information, which has not been reported from terminal 100, based on the PH information of a beam that has been reported from terminal 100. The PH information estimation method in scheduler 204 will be described in detail, hereinafter. Scheduler 204 outputs the determined scheduling information to control information generator 205.

Control information generator 205 generates a control signal containing scheduling information for indication to terminal 200, based on an instruction from scheduler 204, and outputs the control signal to encoder/modulator 206.

Encoder/modulator 206 encodes and modulates the control signal to be inputted from control information generator 205 and outputs the modulated signal to radio transmitter 207.

Radio transmitter 207 applies transmission processing, such as digital to analog conversion, up-conversion, and/or amplification, to the signal to be inputted from encoder/modulator 206, and transmits the radio signal thus obtained by the transmission processing to terminal 100 via antenna 205.

[Operations of Terminal 100 and Base Station 200]

Hereinafter, a detailed description will be given of operations of terminal 100 and base station 200 each configured in the manner described above.

Figure 4:
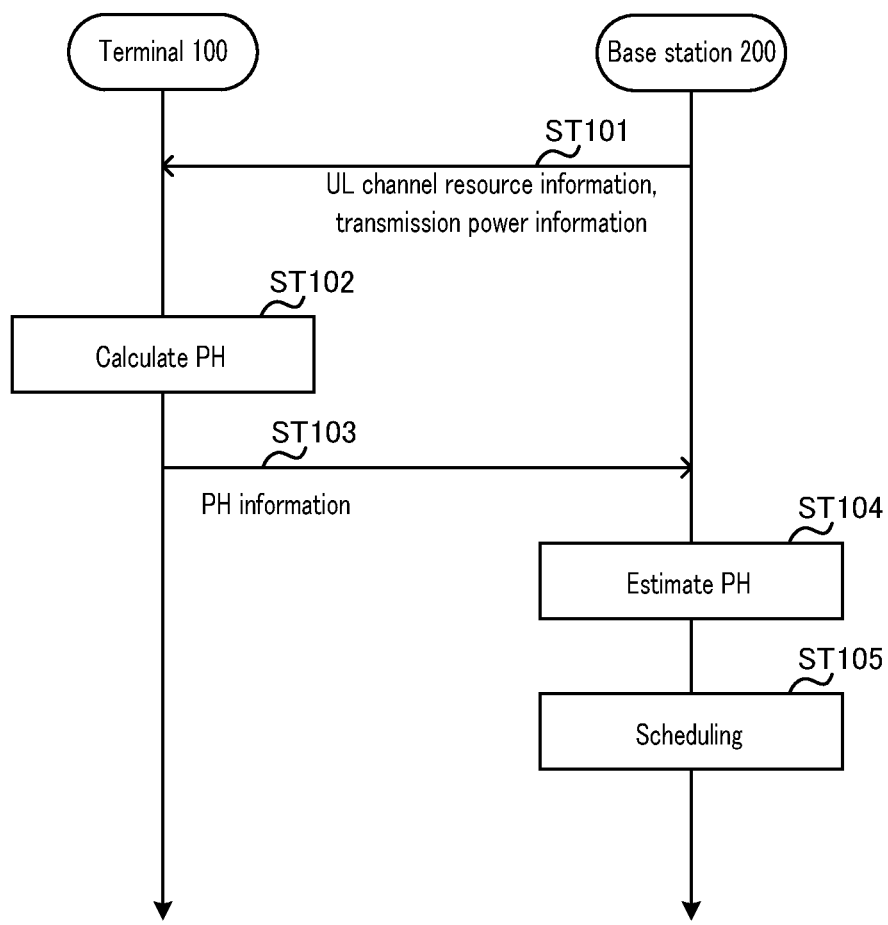
FIG. 4 is a sequence diagram illustrating an operation example of the terminal and base station.

FIG. 4 is a sequence diagram illustrating operations of terminal 100 (FIG. 2) and base station 200 (FIG. 3).

Base station 200 indicates UL channel resource information and transmission power information to terminal 100 (ST101).

Terminal 100 calculates a PH for each beam based on the UL channel resource information and transmission power information (ST102). In this step, terminal 100 configures the number of PHs for the respective beams to be reported to base station 200 (i.e., the number of beams for which PHs are to be reported) in accordance with a PH type.

Terminal 100 then reports PH information indicating a PH calculated in ST 102 to base station 200 (ST103). In other words, terminal 100 transmits, to base station 200, the PHs for respective beams in a number to be determined in accordance with a PH type.

Base station 200 estimates a PH corresponding to a beam that has not been reported as PH information, based on the PH information reported from terminal 100 in ST103 (ST104). Accordingly, base station 200 obtains a PH for each beam in each PH type. Thus, base station 200 performs scheduling of terminal 100 using the PH obtained in ST104 (ST105).

[PH Calculation Method in PH Calculator 105]

Next, a detailed description will be given of a PH calculation method in PH calculator 105 of terminal 100 (processing of ST 102 illustrated in FIG. 4).

PH calculator 105 configures the number of PHs for respective beams (beam specific PHs) to be reported to base station 200, in accordance with a beam type (e.g., such as Type 1 PH or Type 2 PH).

Hereinafter, a description will be given of a case where "N" beams or "N" beam pairs (BPLs) ("N" is an optional integer) can be configured for terminal 100.

PH calculator 105 determines the number of PHs for the respective beams to be reported to base station 200, in accordance with a PH type as in Configuration Examples 1 to 4 below.

Configuration Example 1: Type 1 PH=N and Type 2 PH=1

In Configuration Example 1, PH calculator 105 determines the number of Type 1 PHs to be reported to base station 200 to be "N" and determines the number of Type 2 PHs to be reported to base station 200 to be one.

More specifically, PH calculator 105 calculates N PUSCH-based Type 1 PHs, using $PL_{beam\ \#x}$ (x=0 to N−1) respectively corresponding to beams #0 to #N−1 and calculates one PUSCH+PUCCH-based Type 2 PH, using $PL_{beam\ \#n}$ corresponding to beam #n (where "n" is an optional integer of 0 to N−1).

Accordingly, terminal 100 transmits N Type 1 PHs and one Type 2 PH.

The one Type 2 PH to be transmitted from terminal 100 may be a PH corresponding to a beam to be applied to PUSCH used in transmission of PH information. Alternatively, as the one Type 2 PH to be reported from terminal 100, beams #1 to N corresponding to a Type 2 PH to be transmitted may be sequentially switched from one to another every timing at which PHR is performed.

Note that, a Type 2 PH of a beam for which no PH is reported from terminal 100 (beam other than beam #n) is estimated in base station 200 based on the N Type 1 PHs which have been reported in the number "N," and Type 2 PH of beam #n (to be described in detail, hereinafter).

As described above, reducing the number of Type 2 PHs to be reported from terminal 100 to base station 200 in PHR can reduce the overhead for PHR.

<Configuration Example 2: Type 1 PH=N, Type 2 PH=1, and Type N1 PH=1>

In NR, there is a possibility that a new PH type (e.g., Type N1 PH, Type N2 PH, and so forth) other than the PH types of PUSCH-based Type 1 PH and PUSCH+PUCCH-based Type 2 PH is added. For example, a PH for a channel or a combination of channels other than PUSCH or PUSCH+PUCCH may be defined as a new PH type.

In this respect, in Configuration Example 2, a description will be given of a case where Type N1 PH is added in addition to Type 1 PH and Type 2 PH, as an example.

In Configuration Example 2, PH calculator 105 determines the number of Type 1 PHs to be reported to base station 200 to be "N" and determines each of the numbers of Type 2 PHs and Type N1 PHs to be reported to base station 200 to be one.

More specifically, as in Configuration Example 1, PH calculator 105 at least calculates N PUSCH-based Type 1 PHs, using $PL_{beam\ \#x}$=0 to N−1) corresponding respectively to beams #0 to #N−1. Moreover, PH calculator 105 at least calculates one PUSCH+PUCCH-based Type 2 PH, using a $PL_{beam\ \#n}$ corresponding to beam #n (where "n" is an optional integer of 0 to N−1) and calculates one Type N1 PH, using a $PL_{beam\ \#m}$ corresponding to beam #m (where "m" is an optional integer of 0 to N−1).

More specifically, terminal 100 transmits N Type 1 PHs, and transmits one Type 2 PH and one Type N1 PH.

Note that, PHs to be calculated (reported) as a Type 2 PH and Type N1 PH may be a PH corresponding to the same beam (i.e., n=m) or PHs corresponding to different beams (i.e., n≠m).

Moreover, Type 2 PH of a beam for which no PH is reported from terminal 100 (beam other than beam #n) and Type N1 PH of a beam for which no PH is reported from terminal 100 (beam other than beam #m) are estimated based on the N Type 1 PHs which have been reported, and Type 2 PH of beam #n and Type N1 PH of beam #m (to be described in detail, hereinafter).

As described above, reducing the number of Type 2 PHs and Type N1 PHs to be reported from terminal 100 to base station 200 in PHR makes it possible to reduce the overhead for PHR.

Configuration Example 3: Type 1 PH=M (M≤N), and Type 2 PH=1

In Configuration Example 3, PH calculator 105 determines the number of Type 1 PHs to be reported to base station 200 to be "M" ("M" is an integer satisfying M≤N) and determines the number of Type 2 PHs to be reported to base station 200 to be one.

PH calculator 105 calculates at least M PUSCH-based Type 1 PHs, using PLs corresponding respectively to M beams among beams #0 to #N−1 and calculates one PUSCH+PUCCH-based Type 2 PH, using a PL corresponding to beam #n ("n" is an optional integer from 0 to N−1).

More specifically, terminal 100 transmits M Type 1 PHs and transmits one Type 2 PH.

Note that, M Type 1 PHs may be PHs for M beam candidates having a high possibility of being used by terminal 100 in PUSCH transmission, for example. Beam candidates may be M beams including a beam to be applied to PUSCH used in transmission of PH information and beams adjacent to this beam, positioned immediately before and after the beam. In other words, beam candidates may include a beam which is currently used or a beam having a high possibility of being used immediately in terminal 100. Accordingly, M Type 1 PHs include at least a Type 1 PH for a beam to be applied to PUSCH used in transmission of PHs and a Type 1 PH for beams adjacent to the beam to be applied to PUSCH.

As described above, according to Configuration Example 3, terminal 100 can further reduce the overhead for PHR by selecting M beam candidates from among N beams that can be configured in terminal 100 and reporting PHs.

Moreover, when the optimum beam for terminal 100 does not significantly change temporally, there is a high possibility that any of the M beam candidates among the N beams is configured for terminal 100. In other words, since the possibility that a beam other than the M beam candidates among the N beams is configured for terminal 100 is low, degradation of the reception performance in base station 200 can be prevented even without reporting of a PH for a beam other than the M beam candidates, so that there is no impact on the scheduling performance.

Configuration Example 4: Type 1 PH=M (M≤N), and Type 2 PH=M' (M'≤N

In Configuration Example 4, PH calculator 105 determines the number of Type 1 PHs to be reported to base station 200 to be "M" ("M" is an integer satisfying M≤N) and determines the number of Type 2 PHs to be reported to base station 200 to be M' ("M" is an integer satisfying M'≤N).

More specifically, PH calculator 105 calculates at least M PUSCH-based Type 1 PHs, using PLs corresponding respectively to M beams and calculates M'PUSCH+PUCCH-based Type 2 PH, using PLs corresponding respectively to M' beams among beams #0 to #N−1.

Accordingly, terminal 100 transmits M Type 1 PHs and transmits M' Type 2 PHs.

Note that, depending on implementation of terminal 100, there is a possibility that a beam used in PUSCH transmission and a beam used in PUCCH transmission are different. In this case, in base station 200, it is impossible to estimate an unreported PH of a certain PH type by using a PH of another PH type. For this reason, terminal 100 reports PHs corresponding to multiple beams for each PH type.

Moreover, as in Configuration Example 3, M Type 1 PHs may be M beam candidates having a high possibility of being used by terminal 100 in PUSCH transmission, for example. Likewise, M' Type 2 PHs may be M' beam candidates having a high possibility of being used by terminal 100 in PUSCH and PUCCH transmission, for example.

As described above, according to Configuration Example 4, terminal 100 can further reduce the overhead for PHR by selecting M beam candidates and reporting Type 1 PHs and selecting M' beam candidates and reporting Type 2 PHs from among N beams that can be configured in terminal 100.

Moreover, when the optimum beam for terminal 100 does not significantly change temporally, there is a high possibility that any of the M beam candidates and M' beam candidates among the N beams is configured for terminal 100. In other words, since the possibility that a beam other than the M beam candidates and M' beam candidates among the N beams is configured for terminal 100 is low, degradation of the reception performance in base station 200 can be prevented even without reporting of a PH for a beam other than the M beam candidates and M' beam candidates, so that there is no impact on the scheduling performance.

Configuration Examples 1 to 4 have been described thus far.

Note that, the number of PHs for each PH type to be reported may be configured by base station 200 in advance based on an antenna condition of terminal 100. Alternatively, the number of PHs for each PH type to be reported may be uniquely configured in terminal 100 or base station 200 based on an antenna condition of terminal 100. For example, terminal 100 having the same beam configuration for PUSCH and PUCCH may employ a configuration of Configuration Example 1 and terminal 100 having different beam configurations for PUSCH and PUCCH may use a configuration of Configuration Example 4. Alternatively, the number of PHs for each PH type to be reported may be configured uniquely by specification.

Moreover, although the number of beams for performing PHR is defined in Configuration Examples 1 to 4, a method in which beam numbers for performing PHR are configured in multiple terminals 100 instead of the number of beams may be employed.

Furthermore, in Configuration Examples 1 to 4, terminal 100 may calculate PHs for respective beams in a number to be determined in accordance with a PH type among N beams and may select PHs in a number to be determined in accordance with a PH type among the PHs calculated respectively for the N beams.

[PH Estimation Method in Scheduler]

Next, a PH estimation method (processing of ST104 in FIG. 4) in scheduler 204 of base station 200 will be described in detail.

As an example, a method will be described in which terminal 100 reports Type 1 PH information of beams #0 to #2 of Equations 9 to 11 below and Type 2 PH information of beam #0 of Equation 12, and base station 200 estimates unreported Type 2 PH information (beams #1 and #2).

Note that, as preconditions, "$P_{cmax\_type1}$," "$\alpha$," and "f" are beam common values, and "$P_{o\_pusch\_beam\ \#x}$" and "$PL_{beam\ \#x}$" are beam specific values. Moreover, "$P_{cmax\_type}$", "$PL_{beam\ \#x}$," "f," and "g" are information unknown to base station 200, and other information is a parameter known to base station 200.

More specifically, terminal 100 reports, to base station 200, Type 1 PHs of three beams #0, #1, and #2 expressed by Equations 9 to 11.

$$PH_{type1\_beam\ \#0} = P_{cmax\_type1} - (P_{o\_pusch\_beam\ \#0} + \alpha * PL_{beam\ \#0} + f) \quad \text{(Equation 9)}$$

$$PH_{type1\_beam \ \#1} = P_{cmax\_type1} - (P_{o\_pusch\_beam \ \#1} + \alpha * PL_{beam \ \#1} + f) \quad \text{(Equation 10)}$$

$$PH_{type1\_beam \ \#2} = P_{cmax\_type1} - (P_{o\_pusch\_beam \ \#2} + \alpha * PL_{beam \ \#2} + f) \quad \text{(Equation 11)}$$

In addition, terminal 100 reports one Type 2 PH (beam #0) expressed by Equation 12 to base station 200. Note that, Equation 12 expresses a PH based on transmission power at the time of FDM of PUSCH and PUCCH.

$$PH_{type2\_beam \ \#0} = P_{cmax\_type2} - (P_{o\_pusch\_beam \ \#0} + \alpha * PL_{beam \ \#0} + (P_{o\_pucch\_beam \ \#0} + PL_{beam \ \#0} + g) \quad \text{(Equation 12)}$$

Base station 200 then estimates, for example, a difference in path loss between beam #1 and beam #0 ($PL_{beam \ \#1} - PL_{beam \ \#0}$) based on a difference in PH between Equations 10 and 9.

$$PL_{beam \ \#1} - PL_{beam \ \#0} = (PH_{type1\_beam \ \#0} - PH_{type1\_beam \ \#1}) - (P_{o\_pusch\_beam \ \#0} - P_{o\_pusch\_beam \ \#1})/\alpha \quad \text{(Equation 13)}$$

Moreover, base station 200 estimates a difference in path loss between beam #2 and beam #0 ($PL_{beam \ \#2} - PL_{beam \ \#0}$) based on a difference between Equations 11 and 9.

$$PL_{beam \ \#2} - PL_{beam \ \#0} = (PH_{type1\_beam \ \#0} - PH_{type1\_beam \ \#2}) - (P_{o\_pusch\_beam \ \#0} - P_{o\_pusch\_beam \ \#2})/\alpha \quad \text{(Equation 14)}$$

Base station 200 then estimates unreported Type 2 PH information (beams #2 and #3) below using the estimated difference in path loss between the beams according to Equations 13 and 14.

$$PH_{type2\_beam \ \#1} = PH_{type2\_beam \ \#0} - (\alpha+1)* (PL_{beam \ \#1} - PL_{beam \ \#0}) \quad \text{(Equation 15)}$$

$$PH_{type2\_beam \ \#2} = PH_{type2\_beam \ \#0} - (\alpha+1)* (PL_{beam \ \#2} - PL_{beam \ \#0}) \quad \text{(Equation 16)}$$

As described above, base station 200 estimates Type 2 PH information of an unreported beam, using a difference in path loss between the beams of Type 1 PH information reported from terminal 100, and Type 2 PH information of a beam reported from terminal 100. Accordingly, base station 200 can obtain all PHs for the respective beams that can be configured in terminal 100, by estimating a PH of an unreported beam based on the reported PHs. Thus, the overhead for PHR can be reduced without degradation of the scheduling performance of base station 200 as compared with a case where PH information for all beams is reported in all PH types.

Note that, even in a case where the preconditions described above are not applied, the effects of reducing the overhead for PHR can be obtained. For example, although "f" and "g" of the transmission power control information are assumed to be information unknown to base station 200 in the preconditions, base station 200 can estimate the values of "f" and "g" when base station 200 keeps an accumulated total of transmission power control values that have been indicated to terminal 100. Although there is an impact due to a situation where terminal 100 has not received the scheduling information (UL grant), the probability is about one percent, so that estimation is possible as long as an error of about several dB is permitted.

As described above, in this embodiment, terminal 100 calculates PHs for respective beams and transmits PHs for beams in a number to be determined in accordance with a PH type. Thus, the overhead for PHR can be reduced.

FIG. 5 illustrates an example of reducing the overhead for PHR according to Embodiment 1. In FIG. 5, the number of beams is set to three, and the amounts of information are illustrated in cases where Type 1 PH and Type 2 PH are respectively reported. Furthermore, the amounts of information of PHs for respective beams are each set to 6 bits in FIG. 5.

Supposedly, in a case where PH information for all beams are reported in Type 1 PH and Type 2 PH, for example, 18 bits are used for each of Type 1 PH and Type 2 PH reporting (6 bits×3 beams), and a total of 36 bits is required. Meanwhile, according to Embodiment 1, 18 bits (6 bits×3 beams) are used for Type 1 PH (Equations 9 to 11) reporting, and 6 bits (6 bits×1 beam) are used for Type 2 PH (Equation 12) reporting, and a total of 24 bits is required. More specifically, according to Embodiment 1, the overhead for PHR is reduced as compared with a case where PHs for all the respective beams are reported (36 bits).

In other words, limiting PHR for multiple beams to some of PH types (Type 1 PH, herein) makes it possible to reduce the overhead for PHR while preventing degradation of the scheduling performance. Thus, according to Embodiment 1, PHR can be performed with a reduced overhead for the PHR by taking into account beam transmission and reception and a channel to be transmitted.

Note that, in Embodiment 1, the case has been described as an example where terminal 100 reports PHs for N (or M) beams for Type 1 PH among N beams and a PH for one (or M') beam (s) for Type 2 PH. However, these numbers of beams (one, M, and M') are only exemplary, and may be other values. For example, as long as the number (e.g., M') used for reporting Type 2 PH is lower than the number (e.g., M) used for reporting Type 1 PH, the overhead for PHR can be reduced.

Furthermore, in Embodiment 1, the case has been described where the number of Type 1 PH reports is larger than the number of Type 2 PH reports, but the number of Type 2 PH reports may be larger than the number of Type 1 PH reports. In this case, base station 200 may estimate unreported Type 1 PH, using Type 2 PH.

Variation of Embodiment 1

In a variation, as addition information in PHR, terminal 100 may report the actual maximum transmission power information (Actual $P_{cmax\_type1}$, and Actual $P_{cmax\_type2}$) of terminal 100, which are unknown to base station 200.

For example, as illustrated in FIG. 6, when the amount of information of the maximum transmission power information is 6 bits as in the PHs, a total amount of information of PH information is 36 bits. More specifically, as compared with the case where PH information of all beams is reported (36 bits), the total amount of information does not increase although the maximum transmission power information is newly indicated. Moreover, base station 200 can accurately estimate a PH of terminal 100 by using the maximum transmission power information indicated from terminal 100, and can improve the scheduling performance.

Embodiment 2

Note that, a terminal and a base station according to Embodiment 2 have basic configurations common to terminal 100 and base station 200 according to Embodiment 1, so that a description will be given while FIGS. 2 and 3 are incorporated herein.

In Embodiment 2, an operation of PH calculator 105 of terminal 100 is different from that in Embodiment 1.

[PH Calculation Method in PH Calculator 105]

Terminal 100 (PH calculator 105) configures, in accordance with a trigger condition of PHR, the number of PHs for respective beams to be reported (i.e., the number of beams for which PHs are reported) to base station 200. More specifically, in Embodiment 2, terminal 100 reports, to base station 200, PHs for respective beams in a number to be determined in accordance with a trigger condition of PHR.

Examples of the trigger conditions of PHR herein include the following two patterns (trigger conditions 1 and 2), and when any of the conditions is satisfied, terminal 100 performs PHR. Trigger conditions 1 and 2 below are each a condition extended from a trigger condition of PHR prescribed in LTE, for NR, by taking into account a PL for each beam.

1. Case where a predetermined period has passed since the last PHR and also a PL for each beam used in transmission of the last PHR has changed by an amount equal to or greater than a threshold [dB].

2. Case where a predetermined period has passed since timing of the last PHR.

Note that, the "predetermined period" in trigger condition 1 and the "predetermined period" in trigger condition 2 may be the same or different from each other. The "predetermined period" in trigger condition 1 may be shorter than the "predetermined period" in trigger condition 2, for example.

In Embodiment 2, in a case where trigger condition 1 is satisfied (case where the change mount of PL since the last PHR is equal to or greater than a threshold), terminal 100 transmits, to base station 200, a PH for a beam for which PL has changed by an amount equal to or greater than the threshold. In this case, terminal 100 transmits, to base station 200, the beam number corresponding to the PH to be reported to base station 200.

In a case where PL of beam #x has changed by an amount equal to or greater than a threshold, for example, terminal 100 reports, to base station 200, a PH of beam #x of each PH type (e.g., $PH_{type1\_beam\ \#x}$ or $PH_{type2\_beam\ \#x}$) and beam number #x. Moreover, in a case where PLs of multiple beams #x1 and #x2 have each changed by an amount equal to or greater than a threshold, terminal 100 reports, to base station 200, PHs (e.g., $PH_{type1\_beam\ \#1}$, $PH_{type1\_beam\ \#2}$, $PH_{type2\_beam\ \#1}$, and $PH_{type2\_beam\ \#2}$) of the multiple beams that have changed, and beam numbers #x1 and #x2.

As described above, terminal 100 reports PHs in a number to be determined in accordance with a trigger condition of PHR to base station 200.

Accordingly, in a case where trigger condition 1 (trigger condition by PL change) is satisfied, a PH that requires updating is reported without reporting of a PH that requires no updating, so that the overhead for PHR can be reduced. Moreover, in a case where trigger condition 1 is satisfied, a PH of a beam for which a PL has changed by an amount equal to or greater than a threshold is reported to base station 200, and base station 200 can improve the scheduling performance for terminal 100 by using the reported PL. Meanwhile, a PH of a beam for which a PL has not changed by an amount equal to or greater than a threshold is not reported to base station 200, and base station 200 continues using the last reported PH for any beam for which the PL has not changed by an amount equal to or greater than a threshold. In this case, since the PL has not changed by an amount equal to or greater than a threshold, however, base station 200 can perform scheduling appropriate to the situation of terminal 100, using the last reported PH, so that degradation of the scheduling performance attributable to an unreported PH does not occur.

Meanwhile, in a case where trigger condition 2 is satisfied (case where predetermined period has passed), terminal 100 reports PHs of all beams of each PH type to base station 200.

Accordingly, in a case where trigger condition 2 is satisfied, since the PHs of all beams of each PH type are updated, degradation of the scheduling performance can be prevented.

Note that, in a case where trigger condition 2 is satisfied, as a method of reporting PHs of all beams of each PH type, the method described in Embodiment 1 may be combined. In a case where trigger condition 2 is satisfied, for example, terminal 100 may report Type 1 PHs of all beams and a Type 2 PH of one beam to base station 200, and base station 200 may estimate an unreported PH, using the reported PHs.

Moreover, in order to set the data length of PHR to be a fixed size, the number of PHs (the number of beams) to be reported in case of trigger condition 1 may be limited. The number of PHs to be reported in case of trigger condition 1 may be limited to one, for example. In this case, in a case where the PL of one beam has changed by an amount equal to or greater than a threshold, terminal 100 reports the PH of the beam for which the PL has changed by an amount equal to or greater than a threshold and the beam number. Meanwhile, in a case where PLs for multiple beams have each changed by an amount equal to or greater than a threshold, terminal 100 reports the PHs of all the beams as in the case of trigger condition 2. Accordingly, it is possible to prevent PHR from having various data lengths due to the number of beams that satisfy trigger condition 1. Moreover, for reporting the data size of PHR to base station 200, terminal 100 may indicate the trigger condition (trigger condition 1 or 2), using 1 bit.

Embodiment 3

Note that, a terminal and a base station according to Embodiment 3 have basic configurations common to terminal 100 and base station 200 according to Embodiment 1, so that a description will be given while FIGS. 2 and 3 are incorporated herein.

In Embodiment 3, an operation of PH calculator 105 of terminal 100 and an operation of scheduler 204 of base station 200 are different from the respective operations in Embodiment 1.

[PH Calculation Method in PH Calculator 105] Terminal 100 (PH calculator 105) calculates a PH (e.g., suppose $PH_{type1\_beam\ \#0}$ or $PH_{type2\_beam\ \#0}$) of one beam among N beams in each PH type. Moreover, terminal 100 calculates an offset value (i.e., difference) with respect to the reported one PH ($PH_{type1\_beam\ \#0}$ or $PH_{type2\_beam\ \#0}$) in a PH of a beam other than the one beam for which PHR is performed (e.g., $PH_{type1\_beam\ \#1}$ to $PH_{type1\_beam\ \#N}$, $PH_{type2\_beam\ \#1}$ to $PH_{type2\_beam\ \#N}$).

In other words, terminal 100 transmits, to base station, as PH information, a PH of one beam and an offset value with respect to the PH of the one beam in a PH other than the PH of the one beam in each PH type.

In a case where a PH ($PH_{type1\_beam\ \#0}$) (absolute value) of beam #0 is reported and an offset value of the PH of beam #1 is reported in Type 1 PH, for example, terminal 100 reports an offset value ($PH_{type1\_beam\ \#1\_offset}$) expressed by Equation 17, as the PH information of $PH_{type1\_beam\ \#1}$.

$$PH_{type1\_beam\ \#1\_offset} = PH_{type1\_beam\ \#1} - PH_{type1\_beam\ \#0} \quad \text{(Equation 17)}$$

The size of an offset value herein is reduced as compared with the size of a PH. The range of a PH is from −23 dB to 40 dB and a PH is transmitted, using 6 bits in LTE, for example. Meanwhile, an offset value between beams is considered to be as large as about ±10 dB. Accordingly, when an offset value has about a granularity of 1 dB as in a PH, the offset value falls within a range of from 10 dB to −10 dB, and the size of an offset value can be reduced to 5 bits.

Note that, in each PH type, the beam number for reporting a PH of an absolute value rather than an offset value may be the beam number of a beam applied to PUSCH. Alternatively, the beam number for reporting a PH of an absolute value may be the beam number previously indicated by base station 200, or may be the beam number prescribed by specification. Still alternatively, as the beam number for reporting a PH of an absolute value, beam numbers may be sequentially switched from one to another every PH reporting timing.

[PH Estimation Method in Scheduler 204]

Next, a PH estimation method in scheduler 204 of base station 200 according to Embodiment 3 will be described in detail.

Base station 200 (scheduler 204) calculates, using a PH ($PH_{type1\_beam\ \#0}$) of a certain beam reported from terminal 100 and an offset value ($PH_{type1\_beam\ \#1\_offset}$ to $PH_{type1\_beam\ \#N\_offset}$) of another beam, the PH of the other beam ($PH_{type1\_beam\ \#1}$ to $PH_{type1\_beam\ \#N}$) in each PH type (e.g., Type 1 PH herein). The PH (e.g., $PH_{type1\_beam\ \#1}$ herein) of the beam for which no absolute value is reported (an offset value has been reported) is calculated according to Equation 18.

$$PH_{type1\_beam\ \#1} = PH_{type1\_beam\ \#1\_offset} + PH_{type1\_beam\ \#0} \quad \text{(Equation 18)}$$

Advantageous Effects

As described above, terminal 100 reports, in each PH type, a PH (absolute value) of one beam and an offset value of a PH smaller in size than the PH (absolute value). Thus, the overhead for PHR can be reduced as compared with a case where the PHs of all beams are reported.

FIG. 7 illustrates an example of reducing the overhead for PHR according to Embodiment 3. In FIG. 7, the number of beams is set to three, and the amounts of information are illustrated in cases where Type 1 PH and Type 2 PH are respectively reported. Furthermore, the amounts of information of PHs (absolute values) for respective beams are each set to 6 bits, and the amounts of information of offset values of PHs are each set to 5 bits in FIG. 7.

Supposedly, in a case where PH information for all beams are reported in Type 1 PHR and Type 2 PHR, for example, 18 bits are used for each of Type 1 PH and Type 2 PH reporting (6 bits×3 beams), and a total of 36 bits is required. Meanwhile, according to Embodiment 3, 6 bits are used for reporting a PH ($PH_{type1\_beam\ \#0}$) of beam #0, and 10 bits (5 bits×2 beams) are used for reporting offset values ($PH_{type1\_beam\ \#1\_offset}$ and $PH_{type1\_beam\ \#2\_offset}$) of PHs of other beams #1 and #2, and a total of 32 bits is required in PH Types of Type 1 PH and Type 2 PH. More specifically, according to Embodiment 3, the overhead for PHR is reduced as compared with a case where PHs for all the respective beams are reported (36 bits).

Note that, Embodiment 3 may be combined with Embodiment 1. For example, terminal 100 reports PH information (absolute value and offset value of PHs) for PHs of all beams for Type 1 PH as described in Embodiment 3, and terminal 100 reports a PH (absolute value) of one beam for Type 2 PH as described in Embodiment 1. In this case, base station 200 estimates unreported Type 2 PH information from Type 1 PH information and Type 2 PH information reported from terminal 100, as described in Embodiment 1.

FIG. 8 illustrates an example of reducing the overhead for PHR in a case where Embodiment 3 and Embodiment 1 are combined. In FIG. 8, the number of beams is set to three as in FIG. 7, and the amounts of information are illustrated in cases where Type 1 PH and Type 2 PH are respectively reported. Furthermore, the amounts of information of PHs (absolute values) for respective beams are each set to 6 bits, and the amounts of information of offset values of PHs are each set to 5 bits in FIG. 8.

As illustrated in FIG. 8, when Embodiments 3 and 1 are combined, 6 bits are used for reporting a PH ($PH_{type1\_beam\ \#0}$) of beam #0, and 10 bits (5 bits×2 beams) are used for reporting offset values ($PH_{type1\_beam\ \#1\_offset}$ and $PH_{type1\_beam\ \#2\_offset}$) of other beams #1 and #2 for Type 1 PH. Meanwhile, as illustrated in FIG. 8, 6 bits are used for reporting a PH ($PH_{type2\_beam\ \#0}$) of beam #0 for Type 2 PH. Accordingly, when Embodiments 3 and 1 are combined, a total of 22 bits is required. More specifically, combining Embodiments 3 and 1 makes it possible to reduce the total amount of information of PHR from 36 bits to 22 bits as illustrated in FIG. 8.

Each embodiment of the present disclosure has been described thus far.

Note that, the term "beam" or "beams" mentioned above may be defined as follows.

(1) Transmission directivity pattern of terminal 100 (including analog beam forming).

(2) Reception directivity pattern of base station 200 (including analog beam forming).

(3) Combination of transmission directivity pattern of terminal 100 and reception directivity pattern of base station 200 (BPL).

(4) Precoding Matrix Indicator (PMI)

(5) Codebook Number

Furthermore, in NR, studies have been carried out on applying an independent transmission power control value to each service type (also called each traffic). The required quality differs between an eMBB service and a URLLC service, for example, so that transmission power control for these services may be possibly performed independently. Thus, the PH reporting method described in each of Embodiments 1 to 3 may be applied according to a service type. In case of Embodiment 1, for example, terminal 100 may report M PHs for a certain service to base station 200 and may report M' (where M'<M) PHs for another service to base station 200. In this case, base station 200 may estimate an unreported PH, using the reported PHs.

Note that, in LTE-Advanced, no PUSCH/PUCCH is configured at the time of time division duplex (TDD), and in a CC in which an SRS alone is transmitted as a UL channel, Type 3 PH expressed by Equation 19 is indicated.

$$PH_{type3} = P_{cmax\_type3} - P_{SRS} \quad \text{(Equation 19)}$$

$$P_{SRS} = 10 \log 10(M_{SRS}) + P_{o\_SRS} + \alpha_{SRS} \cdot PL + f_{SRS} \quad \text{(Equation 20)}$$

In Equations 19 and 20, "$P_{cmax\_type3}$" represents the maximum transmission power [dBm] of a terminal during SRS transmission, "$M_{SRS}$" represents the transmission bandwidth [PRB] of SRS, "$P_{o\_SRS}$" represents a parameter value [dBm] previously configured by a base station, "PL" represents a path loss [dB] measured by a terminal, "$\alpha_{SRS}$" represents a weight coefficient (previously configured value) indicating a compensation factor of the path loss, and "$f_{SRS}$" represents an additional value including a passed transmission power control value.

In NR, in a case where a PH for each beam is indicated, using a PL for each beam for Type 3 PH, Embodiment 3 may be applied to Type 3 PH. In a case where Type 3 PH and Type N1 PH (a newly added PH type) are reported simultaneously, for example, terminal 100 may indicate Type 3 PHs for N beams and indicate Type N1 PH for one beam as in Embodiment 1. Moreover, terminal 100 may report, to base station 200, Type 3 PHs for respective beams in a number to be determined in accordance with a trigger condition of PHR as in Embodiment 2. Furthermore, terminal 100 may report, to base station 200, a Type 3 PH for one beam and an offset value with respect to the Type 3 PH for the beam in a Type 3 PH for another beam, as PH information, as in Embodiment 3. Thus, the overhead for PHR can be reduced as in the embodiments described above.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

A terminal according to this disclosure includes: circuitry, which, in operation, calculates one or more power headrooms, each of which being calculated for each beam; and a transmitter, which in operation, transmits the one or more power headrooms for a number of beams, the number being determined in accordance with a type of power headroom, or a trigger condition serving as a trigger for power headroom reporting.

In the terminal according to this disclosure, the type at least includes: a first type of power headroom to be calculated based on transmission power of an uplink data channel; and a second type of power headroom to be calculated based on transmission power of an uplink channel including an uplink control channel, and the transmitter transmits the first type of power headrooms for M beams (M is an optional integer) and transmits the second type of power headroom(s) for M' beam(s) (M' is an optional integer), the M' beam(s) being less than the M beams.

In the terminal according to this disclosure, the M' is one, and the transmitter switches, from one to another, every timing of the power headroom reporting, the beams corresponding to the second type of power headroom to be transmitted.

In the terminal according to this disclosure, the M is not greater than N (N is an optional integer) that is a maximum number of beams configurable in the terminal, and the first type of power headrooms for the M beams include: the first type of power headroom for a first beam to be applied to the uplink data channel to be used in transmission of the first type of power headroom; and the first type of power headroom for a second beam adjacent to the first beam.

In the terminal according to this disclosure, the trigger condition includes: a first condition that is a case where a change amount of a path loss since the last power headroom reporting is equal to or greater than a threshold; and a second condition that is a case where a predetermined period has passed since timing of the last power headroom reporting, and the transmitter transmits, in a case where the first condition is satisfied, the power headroom for a beam for which the change amount of the path loss is equal to or greater than the threshold, and the transmitter transmits the power headrooms for all beams in a case where the second condition is satisfied.

In the terminal according to this disclosure, the transmitter transmits, in each of the types, a first power headroom for one beam, and an offset value with respect to the first power headroom in a second power headroom other than the first power headroom.

A communication method according to this disclosure includes: calculating one or more power headrooms, each of which being calculated for each beam; and transmitting the one or more power headrooms for a number of beams, the number being determined in accordance with a type of power headroom, or a trigger condition serving as a trigger for power headroom reporting.

INDUSTRIAL APPLICABILITY

An aspect of this disclosure is useful in mobile communication systems.

REFERENCE SIGNS LIST

100 Terminal
101, 201 Antenna
102, 202 Radio receiver
103, 203 Demodulator/Decoder
104 Transmission power controller
105 PH calculator
106 Data generator
107, 206 Encoder/Modulator
108, 207 Radio transmitter
200 Base station
204 Scheduler
205 Control information generator

The invention claimed is:

1. A terminal comprising:
   circuitry, which, in operation, configures a number of beam-specific power headroom reporting(s) for each type of multiple types of power headroom reporting; and
   a transmitter, which, in operation, transmits one or more beam-specific power headroom reporting(s) for each type, in accordance with the number of beam-specific power headroom reporting(s) configured for each type.

2. The terminal according to claim 1, wherein
   the type at least includes: a first type of power headroom reporting to be determined based on transmission power of an uplink data channel; and a second type of power headroom reporting to be determined based on transmission power of an uplink channel including an uplink control channel, and
   the circuitry configures the number of the first type of power headroom reporting(s) to be M (M is an arbitrary integer) and configures the number of the second type of power headroom reporting(s) to be M' (M' is an arbitrary integer), wherein M' is less than M.

3. The terminal according to claim 2, wherein

M' is one, and the transmitter switches beams for the second type of power headroom reporting, from one to another, at every timing of the second type of power headroom reporting.

4. The terminal according to claim 2, wherein

M is not greater than N (N is an arbitrary integer) that is a maximum number of beams configurable in the terminal, and M number of the first type of power headroom reporting(s) include: the first type of power headroom reporting for a first beam to be applied to the uplink data channel to be used in transmission of the first type of power headroom reporting; and the first type of power headroom reporting for a second beam adjacent to the first beam.

5. The terminal according to claim 1, wherein the transmitter transmits, in each of the types, a first power headroom for one beam, and an offset value with respect to the first power headroom in a second power headroom different from the first power headroom.

6. A communication method comprising:

configuring a number of beam-specific power headroom reporting(s) for each type of multiple types of power headroom reporting; and transmitting one or more beam-specific power headroom reporting(s) for each type, in accordance with the number of beam-specific power headroom reporting(s) configured for each type.

7. The communication method according to claim 6, wherein the type at least includes: a first type of power headroom reporting to be determined based on transmission power of an uplink data channel; and a second type of power headroom reporting to be determined based on transmission power of an uplink channel including an uplink control channel, and the communication method comprises configuring the number of the first type of power headroom reporting(s) to be M (M is an arbitrary integer) and configuring the number of the second type of power headroom reporting(s) to be M' (M' is an arbitrary integer), wherein M' is less than M.

8. The communication method according to claim 7, wherein

M' is one, and the communication method comprises switching beams for the second type of power headroom reporting, from one to another, at every timing of the second type of power headroom reporting.

9. The communication method according to claim 7, wherein

M is not greater than N (N is an arbitrary integer) that is a maximum number of beams configurable in a terminal, and M number of the first type of power headroom reporting(s) include: the first type of power headroom reporting for a first beam to be applied to the uplink data channel to be used in transmission of the first type of power headroom reporting; and the first type of power headroom reporting for a second beam adjacent to the first beam.

10. The communication method according to claim 6, comprising:

transmitting, in each of the types, a first power headroom for one beam, and an offset value with respect to the first power headroom in a second power headroom different from the first power headroom.

11. A terminal comprising:

circuitry, which, in operation, configures a number of beam-specific power headroom reporting(s) for each trigger condition of multiple trigger conditions for power headroom reporting; and a transmitter, which, in operation, transmits one or more beam-specific power headroom reporting(s) for each trigger condition, in accordance with the number of beam-specific power headroom reporting(s) configured for each trigger condition.

12. The terminal according to claim 11, wherein the trigger condition includes: a first condition that is satisfied when a change amount of a path loss since the last power headroom reporting is equal to or greater than a threshold; and a second condition that is satisfied when a predetermined period has passed since timing of the last power headroom reporting, and the circuitry configures the number of beam-specific power headroom reporting(s) to be, in response to the first condition being satisfied, a number of beams for which the change amount of the path loss is equal to or greater than the threshold, and configures the number of beam-specific power headroom reporting(s) to be a number of all beams in response to the second condition being satisfied.

* * * * *